United States Patent [19]
Kaelin

[11] 3,965,009
[45] June 22, 1976

[54] APPARATUS FOR BIOLOGICAL PURIFICATION OF AN EFFLUENT

[76] Inventor: Joseph Richard Kaelin, Villa Seeburg, CH-6374 Buochs, Switzerland

[22] Filed: Aug. 19, 1974

[21] Appl. No.: 498,410

[30] Foreign Application Priority Data
Aug. 23, 1973 Switzerland.................... 12108/73

[52] U.S. Cl............................ 210/218; 210/219; 210/220; 210/242 A
[51] Int. Cl.² ............................................ C02C 1/10
[58] Field of Search ...................... 210/4–7, 210/12, 14, 15, 63, 86, 103, 104, 112, 114, 218–221, 236; 261/87, 91, 93, 125, DIG. 47; 214/17 BD; 259/66, 67, 107, 108

[56] References Cited
UNITED STATES PATENTS

| | | | |
|---|---|---|---|
| 2,308,751 | 1/1943 | Guthrie et al..................... | 261/87 X |
| 2,527,097 | 10/1950 | Katow........................... | 261/DIG. 47 |
| 2,713,477 | 7/1955 | Daman........................... | 261/87 |
| 2,801,014 | 7/1957 | Colson...................... | 214/17 DB X |
| 3,025,962 | 3/1962 | Williams......................... | 210/86 |
| 3,294,491 | 12/1966 | Brown......................... | 214/17 DB X |
| 3,382,981 | 5/1968 | Hampton...................... | 210/220 X |
| 3,442,386 | 5/1969 | Malm et al..................... | 210/219 X |
| 3,470,092 | 9/1969 | Bernard.......................... | 210/15 |
| 3,547,811 | 12/1970 | McWhirter..................... | 210/15 X |
| 3,547,814 | 12/1970 | McWhirter..................... | 210/14 X |
| 3,730,883 | 5/1973 | Lefrancois........................ | 210/12 X |

Primary Examiner—Charles N. Hart
Assistant Examiner—Robert H. Spitzer
Attorney, Agent, or Firm—Oblon, Fisher, Spivak, McClelland & Maier

[57] ABSTRACT

In an installation for the biological purification of effluent at least two basins linked with each other are used. The effluent to be purified is supplied to one basin to introduce oxygen into the effluent. The effluent enriched in this manner with oxygen is supplied after an average residence time to the second basin acting as the final purification basin. The purified water is removed from the said second basin, until the activated sludge concentration in the first basin drops below a certain value, following which the direction of operation is changed, so that the second basin functions as the activated sludge basin and the first basin as the final purification basin connected in series.

1 Claim, 3 Drawing Figures

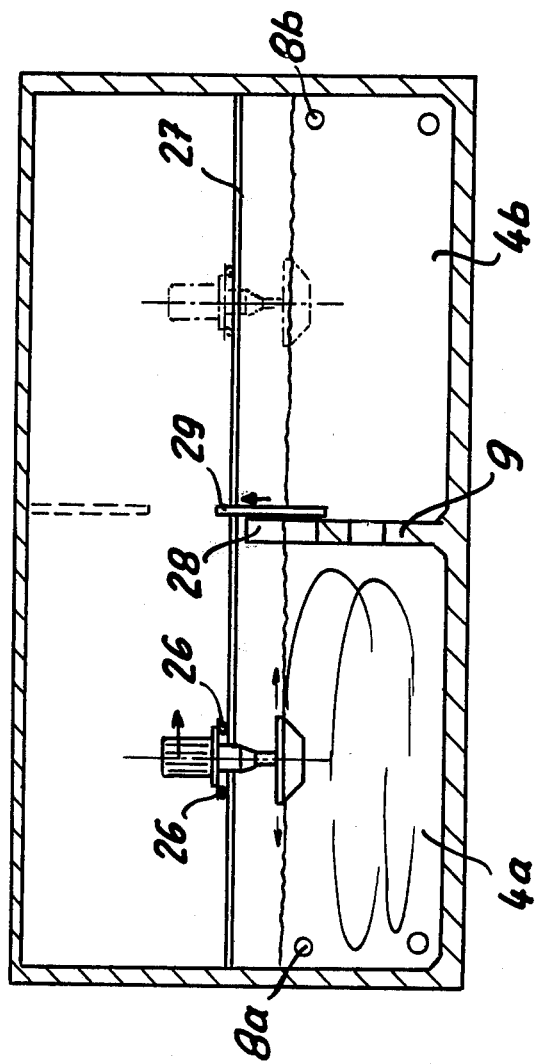

APPARATUS FOR BIOLOGICAL PURIFICATION OF AN EFFLUENT

BACKGROUND OF THE INVENTION

This invention relates to an apparatus for the biological purification of effluent.

Installations for the purification of effluent of known design include a mechanical and a biological purification stage, and also a final purification basin equipped with sludge clearing equipment, sludge recirculation pumps etc. Such installations require a considerable amount of space, and the investment cost is high.

SUMMARY OF THE INVENTION

The object of the invention is the creation of an installation with which the above mentioned disadvantages associated with installations of known design are avoided.

The apparatus in accordance with the invention is characterised by the fact that an effluent purification plant is used which incorporates at least two basins which are linked to each other, and where the effluent to be purified is supplied to a basin which acts as the sludge activating basin, so as to introduce pure oxygen or an oxygen mixture into the effluent in this basin, and where the effluent enriched in this manner in oxygen or in a mixture is supplied after a predetermined, mean residence time to the second basin which serves as the final purification basin, and remove the purified water from the basin, until the activated sludge concentration in the first basin falls below a predetermined value, following which the direction of transfer is reversed, so that the second basin acts as the activated sludge basin, and the first basin as the final purification basin connected in series.

In the case of very deep basins, for example with a depth ranging from 6 to 12 meters, it is advisable to introduce the pure oxygen or the oxygen mixture by means of a liquid recirculation device, preferably a double sided centrifugal pump wheel into the liquid in the aeration basin, where this recirculation device is arranged beneath the liquid level, and where the oxygen or the oxygen mixture is supplied to the liquid recirculation device aspiration area by means of at least one supply pipe.

In order to prevent the deposition of sludge on the bottom of the activated sludge basin, it is advantageous if a flow speed of at least 30 cm/sec. is produced immediately above the bottom of the basin using the oxygenation equipment arranged in the basin functioning as the activated sludge basin.

The subject of this invention is further an installation for the performance of the process in accordance with the invention, which is characterised by the fact that it has at least two basins which are linked with each other, at least one oxygenation device which can be inserted into either of the two basins for the purpose of the introduction of pure oxygen or an oxygen mixture into the liquid which is in the activated sludge basin, and by the fact that the liquid supply and liquid discharge means and the device for the introduction of oxygen are interconnected with each other by means of a control assembly in such a manner, that intermittently the one basin may be operated as the activated sludge basin and the other basin as the final purification basin connected in series and vice versa.

For the purpose of obtaining a compact installation it is advisable to link two basins at their end faces so as to form one unit, and to isolate them from each other by means of a single separating wall which is provided with passages, and in the case of larger installations it may be advantageous for the purpose of reducing the cost of construction to arrange several double basins of this kind so that they are adjoining, in which case two adjoining double basin units have one common wall in each case.

It is advantageous to arrange in each basin an oxygenation device which is either operating or shut down, depending on the direction of operation of the installation.

In order to reduce the number of oxygenation devices and to reduce the costs associated with the provision of these devices, it can be of advantage if the basins are constructed adjoiningly, and if an oxygenation device is provided which can be moved into any basin, where the separating wall between the individual basins is provided with an opening for the oxygenation device, and where this opening can be at least partially closed.

In the case of deep basins, it is advantageous if the oxygenation device is a liquid recirculation device arranged beneath the liquid surface, and preferable, if this device is a double-sided centrifugal pump impeller.

BRIEF DESCRIPTION OF THE DRAWINGS

The invention will now be explained by way of example and with reference to the drawings, wherein:

FIG. 3 illustrates a section analogous to FIG. 2, through a second design example of an installation in accordance with the invention.

DETAILED DESCRIPTION OF PREFERRED EMBODIMENTS

Figure 1:
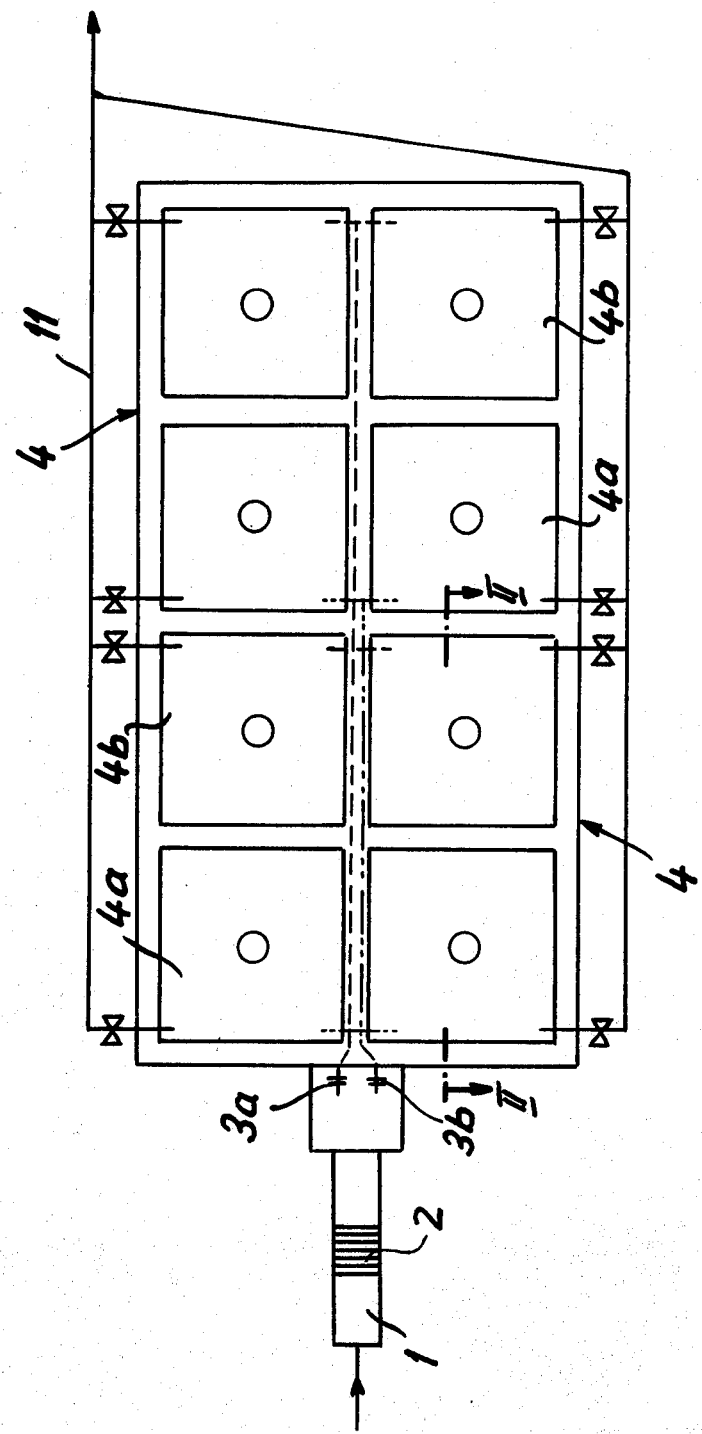
FIG. 1 illustrates a plan view of a design example of an installation in accordance with the invention.
Figure 2:
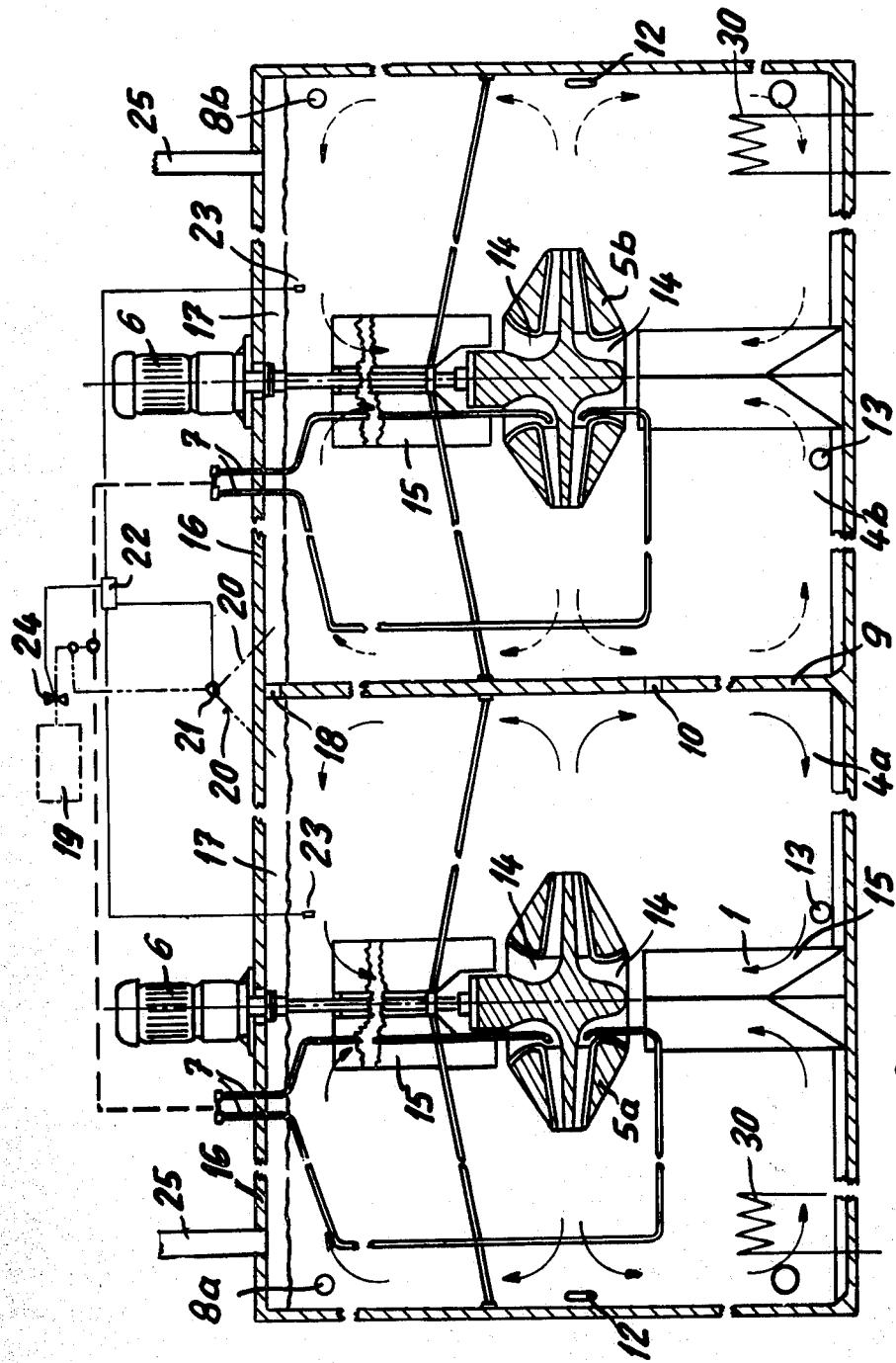
FIG. 2 shows a section along line II—II in FIG. 1, on an enlarged scale.

As can be seen from FIGS. 1 and 2, the effluent to be purified is introduced into one of basins 4a and 4b of a double-basin arrangement 4, through the supply line 1, a crusher 2, a subsequent grit collector and through one of the two remote-controlled supply (gate) valves 3a and 3b immediately above the bottom of the basin. For example, if valve 3a is open, then valve 3b is closed at the same time, so that the effluent to be purified enters only the basin 4a of every double basin unit 4. The aeration turbines 5a are arranged in basin 4a which in this direction of operation acts as the activated sludge basin, and said turbines are designed as double sided centrifugal pump impellers, being powered by associated drive motors 6 so that they rotate, thus transferring pure oxygen or an oxygen mixture, such as air enriched in oxygen, supplied via supply line 7 into the effluent which is contained in basin 4a. The aeration turbines 5b are stationary. The discharge assembly 8b belonging to basin 4b is open, whilst the discharge assembly 8a belonging to basin 4a is closed.

Effluent entering the aeration basin 4a, while continuously mixing with the activated sludge, displaces the effluent/activated sludge mixture, aerated by aerating turbines 5a, through the connecting orifices 10 in the basin separating wall 9 into the neighbouring basin 4b, which takes on the function of a final purification basin inasmuch as the activated sludge is deposited over a distance from the connecting orifices 10 to the discharge assembly 8b on the bottom of basin 4b. The effluent from which the activated sludge has been removed and which has been biologically cleaned leaves this basin 4b acting as a final purification basin 4b through the discharge assembly 8b and passes to the discharge duct 11.

Because with this design of the effluent purification plant the activated sludge is continuously displaced from the basin 4a of a double basin unit 4 into the adjoining basin 4b and is not recirculated, the activated sludge concentration in basin 4a is progressively reduced with increasing operating time. Below a certain activated sludge concentration a considerable decrease in the purification efficiency would result. In addition, the activated sludge in basin 4b would no longer be supplied with oxygen, so that in this basin also consequences would become apparent after a certain period of operation.

In order to eliminate such effects and to ensure proper purification efficiency, the direction of operation in the double basin unit 4 is reversed after a predetermined period. During this changeover, which takes place fully automatically, first of all the aeration turbines 5a are shut down, the discharge assembly 8b is closed and the remote-controlled supply valve 3b is opened. Once the aeration turbines 5a have come to rest, the water in basin 4a ceases to move, so that any activated sludge still present in this basin 4a can settle. The sedimentation of the activated sludge present in basin 4a is monitored using a photoelectric cell assembly 12 arranged at a certain distance below the discharge orifice 8a, where the said photocell sends a control signal for the opening of discharge assembly 8a when there is adequate sedimentation of the activated sludge, which in turn leads to discharge of water from basin 4a. At the same time, the aeration turbines 5b in basin 4b are switched on, and the sludge which has settled in this basin 4b is caused to float as required for the process and supplied again with oxygen.

For the removal of excess sludge, a sludge overflow pipe 13 extends into each of basins 4a and 4b, through which any excessive sludge is removed.

The double-sided centrifugal pump impellers 5a and 5b used in this illustrated installation are particularly suitable for deep basins with a depth of for example 6 to 12 m, because they generate in each of the basins two annular, major recirculation currents arranged one above the other, thus recirculating the total basin content thoroughly and, during re-start of the aeration turbine, quickly dispersing any sludge which has settled during the shut-down of the aeration turbine, as required. The supplies 7 for the supply of pure oxygen or an oxygen mixture into the effluent to be purified extend into the depression zones of the aspiration ducts 14 of the aeration turbines 5a and 5b, so that the gas supplied via pipes 7 is sucked into the fluid (liquid) passing through channels 14 and is intimately mixed with it.

In order to obtain swirl-free, axial entry of the liquid into both inlet orifices of the aeration turbines, deflector plates 15 are arranged in front of the inlet orifices, as seen in the axial direction, said deflector plates (baffles) being cross-shaped.

The aeration turbines are of such a design and dimensioned in such a manner, that during operation a flow speed of at least 30 cm/sec. is produced immediately above the base of the basin so as to avoid any undesirable sludge settlement.

When ordinary air is used to purge the effluent to be purified, the supply pipes 7 may terminate in the open air immediately above the basin.

If pure oxygen or air enriched in oxygen is supplied through supply pipes 7, then the basins 4a and 4b must be sealed with a gas-tight basin cover 16 at their top, so as to avoid unnecessary oxygen loss, and they must be connected by means of an orifice 18 which permits at least the gas exchange between the cavities 17 which are produced above the liquid during operation.

The oxygen required in this installation is generated in an oxygen plant 19, and, depending on the direction of operation in the double basin unit 4 is supplied either to the one or the other aeration turbine 5a or 5b.

Oxygen-containing gas may be withdrawn from cavities 17 through discharge pipes 20, and can be allowed to flow in a controlled manner through a flow control valve 21 into the supply pipe 7.

An oxygen regulating and control system 22, which is connected with oxygen metering probes 23 determining the dissolved oxygen concentration in the liquid in the basin acting as activated sludge basin, controls the regulating valve 21 and a valve 24 which controls the supply of pure oxygen in accordance with a predetermined nominal value.

In addition, extraction pipes 25 are provided, which serve to remove excess gas from the cavities 17. This excess, oxygen-containing gas may for example be reused in a sludge treatment plant which is associated with the effluent treatment plant. In order to increase the biological activity in the activated sludge basin, it is also possible to heat the liquid contained in the basin acting as the activated sludge basin by means of a heat exchanger 30, through which for example the heated cooling water from a nuclear reactor or the waste heat from a sludge processing plant is passed, said heating process increasing the temperature by at least 2°, preferably by 5° to 10°C, relative to the inlet temperature of the liquid to be purified.

In order to avoid the provision of two aeration turbines 5a and 5b for each double basin unit, it is also possible, as shown in FIG. 3, to provide only a single aeration device 4, which can be moved into basin 4a or 4b, where in the illustrated design example a surface aeration impeller 5 is utilized for the introduction of air into the liquid to be purified, and where the said impeller, together with its driving unit 6, is arranged so that it can be moved on rollers 26 on rails 27 arranged along basins 4a and 4b.

If it is intended to change the direction of operation of the illustrated double basin unit, i.e. if basin 4b is to be used as the activated sludge basin, then a slide 29 in the separating wall 9 is raised so as to open a passage 28 for the aeration impeller assembly, following which the aeration impeller 5 can be moved from basin 4a into basin 4b, and the slide 29 can be lowered again.

The control of the supply (gate) valves and the discharge assembly for the purpose of operation of the installation takes place in accordance with the design example illustrated in FIGS. 1 and 2, and therefore does not require detailed description.

What is claimed is:
1. An apparatus for biological purification of an effluent comprising:
two identical basins sealed gas-tight at the top portion thereof and having a common wall, said common wall being provided with through passages interconnecting said basins;

means for feeding said effluent to be purified alternately to one or the other of said basins;

means for discharging purified water alternately from one or the other of said basins;

control means for said feeding and discharging means operative to feed effluent to the one of said basins and to discharge purified liquid from the other of said basins and alternately to feed effluent to the other of said basins and to discharge purified liquid from said one of said basins, whereby when the activated sludge concentration in the one basin drops below a certain level, the direction of operation is changed, so that the other basin functions as the activated sludge basin and the said one of said basins functions as the final purification basin connected in series;

aeration impeller means for enriching said effluent with oxygen or an oxygen mixture and for agitating said effluent in the respective basin operating as the activated sludge basin, said impeller means comprising a double-sided impeller having an oxygen supply line extending into one of the intake openings of said impeller;

a vertically movable slide in the upper region of said common wall for opening and closing a passage in the upper end thereof;

rail and roller means for reciprocally supporting said aeration impeller means on said basins and for slidably moving said aeration impeller means through said moveable slide passage between said basins for disposing the same in operative relation with the respective basin operating as the activated sludge basin; and means for removing excess oxygen from the upper region of said basins.

* * * * *